(12) United States Patent
Mohan

(10) Patent No.: US 10,614,496 B2
(45) Date of Patent: Apr. 7, 2020

(54) SERVICE PROCUREMENT SYSTEM

(71) Applicant: Selva P. Mohan, Cary, NC (US)

(72) Inventor: Selva P. Mohan, Cary, NC (US)

(*) Notice: Subject to any disclaimer, the term of this patent is extended or adjusted under 35 U.S.C. 154(b) by 408 days.

(21) Appl. No.: 15/454,339

(22) Filed: Mar. 9, 2017

(65) Prior Publication Data

US 2018/0260862 A1    Sep. 13, 2018

(51) Int. Cl.
*G06Q 30/00*    (2012.01)
*G06Q 30/06*    (2012.01)

(52) U.S. Cl.
CPC ................ *G06Q 30/0611* (2013.01)

(58) Field of Classification Search
None
See application file for complete search history.

(56) References Cited

U.S. PATENT DOCUMENTS

| | | | | |
|---|---|---|---|---|
| 2009/0112727 A1* | 4/2009 | Chi | ...................... | G06Q 10/103 705/301 |
| 2011/0258125 A1* | 10/2011 | Iyer | ........................ | G06Q 10/10 705/301 |
| 2014/0025421 A1* | 1/2014 | Sen | ........................ | G06Q 10/06 705/7.23 |
| 2014/0156442 A1* | 6/2014 | Cushing | ............. | G06Q 30/0611 705/26.4 |
| 2014/0279149 A1* | 9/2014 | Barlow | .................. | G06Q 30/08 705/26.3 |
| 2016/0055559 A1* | 2/2016 | Heck | .................. | G06Q 30/0621 705/26.5 |

* cited by examiner

*Primary Examiner* — Mila Airapetian
(74) *Attorney, Agent, or Firm* — Dicke, Billig & Czaja, PLLC

(57) ABSTRACT

A computer-implemented service procurement method that includes generating service request vendor attribute content in response to a new service request inquiry from a customer device that is associated with a customer. The service request vendor attribute content is based at least in part on a comparison of vendor attribute information for one or more vendor types and information included with the new service request inquiry. Content is generated for the customer device that includes the service request vendor attribute content. The method includes determining qualified vendor content in response to a service request from the customer device, wherein one or more qualified vendors for the qualified vendor content are determined, at least in part, by comparing vendor profile information for one or more vendors with information included with the service request. The method includes requesting bids for the service request from the one or more qualified vendors by generating content for one or more qualified vendor devices that are associated with the one or more qualified vendors, wherein the content includes the service request, and wherein content is generated for the customer device that includes the qualified vendor content. The method includes, in response to the requesting bids for the service request, receiving a bid amount from at least one of the one or more qualified vendor devices and generating the content for at least some of the one or more qualified vendor devices that includes the bid amount.

20 Claims, 9 Drawing Sheets

600

602

| | | |
|---|---|---|
| Service Category | DJ | — 604 |
| Event Date | | — 606 |
| Location | | — 608 |
| No. of Guests | | — 610 |
| Budget Amount($) | | — 612 |
| Expiry Date | | — 614 |

616
What Kind of Music ☐ Pop         622 ☐ Hip-Hop/Rap        628 ☐ Latin
618 ☐ Rock                          624 ☐ EDM/House/Club    630 ☐ Country
620 ☐ R&B Soul                     626 ☐ Top 40            632 ☐ Other Is your Venue Indoors or Outdoors? ☐ Indoors       638 ☐ I'm not sure
634 ☐ Outdoors                                      640 ☐ Other
636
Does your Venue Provide Sound Equipment? ☐ Yes   ☐ No, DJ must Provide Sound Equipment
642                                              644

Additional Equipment or Services Provided ☐ MC
646                                              652 ☐ Lighting
            ☐ Microphones                            ☐ Fog Machine
648 ☐ Other                                      654
650

Anything else the DJ should know? (Optional)  [_____] — 656

| | |
|---|---|
| Service Category | Photographer | — 704
| Event Date | | — 706
| Location | | — 708
| No. of Guests | | — 710
| Budget Amount($) | | — 712
| Expiry Date | | — 714

Number of Hours ☐ 4 Hrs   ☐ 6 Hrs   ☐ 8 Hrs   ☐ Other
716           718        720        722

Shoot At ☐ Ceremony        ☐ Reception
724                     726

Shoot of Engagement? ☐ Yes   ☐ No
728        730

Album Required? ☐ Yes   ☐ No
732        734

| Service Category | Videographer | — 804 |
| Event Date | | — 806 |
| Location | | — 808 |
| No. of Guests | | — 810 |
| Budget Amount($) | | — 812 |
| Expiry Date | | — 814 |

Type of Event ☐ Engagement ☐ Reception
816 ☐ Wedding 820
818
Type of Location ☐ Indoor 824 ☐ Outdoor
822
Hours of Engagement ☐ 6-8 Hrs ☐ 8-10 Hrs ☐ 10-12 Hrs
826 828 830 836
What type of Video would you like? ☐ Raw Footage ☐ Full Feature Video (30-40 minutes)
832 ☐ Highlight Video (3-4 minutes) ☐ Other
834 838
Additional Services Needed? ☐ Yes ☐ No
840 842

FIG. 8

SERVICE PROCUREMENT SYSTEM

BACKGROUND

A successful event such as a wedding is dependent on the services of a multitude of service providers for service areas such as wedding planning, catering, floral design, photography, videography, etc. A bride that is planning a wedding will often times have to meet with three or more vendors for each service area to discuss matters such as pricing, vendor availability and details of the bride's needs for the event. The bride will have to review and consider price quotes from each vendor for each service area which can be a very tedious and time consuming process. This is because often times thirty or more vendors must be evaluated for an event such as a wedding. In addition, the bride may not be aware of what is required from each vendor for the service desired or what level of pricing for the service is reasonable. This can increase the likelihood that a bride will pay too much for a vendor's services or that a vendor will not be able to meet the needs of the bride at the time of the event.

For these and other reasons, there is a need for the present invention.

SUMMARY

According to an embodiment of a method, the method includes generating, by one or more processors, service request vendor attribute content in response to a new service request inquiry from a customer device that is associated with a customer. The service request vendor attribute content is based at least in part on a comparison of vendor attribute information for one or more vendor types and information included with the new service request inquiry. Content is generated for the customer device that includes the service request vendor attribute content. The method includes determining, by the one or more processors, qualified vendor content in response to a service request from the customer device, wherein one or more qualified vendors for the qualified vendor content are determined, at least in part, by comparing vendor profile information for one or more vendors with information included with the service request. The method includes requesting, by the one or more processors, bids for the service request from the one or more qualified vendors by generating content for one or more qualified vendor devices that are associated with the one or more qualified vendors, wherein the content includes the service request, and wherein content is generated for the customer device that includes the qualified vendor content. The method includes, in response to the requesting bids for the service request, receiving a bid amount from at least one of the one or more qualified vendor devices and generating, by the one or more processors, the content for at least some of the one or more qualified vendor devices that includes the bid amount.

According to an embodiment of a computer program product, the computer program product is embodied in a computer-readable storage device and includes instructions that when executed by a processor, cause the processor to generate service request vendor attribute content in response to a new service request inquiry from a customer device that is associated with a customer, wherein the service request vendor attribute content is based at least in part on a comparison of vendor attribute information for one or more vendor types and information included with the new service request inquiry, and wherein content is generated for the customer device that includes the service request vendor attribute content. The instructions, when executed by a processor, cause the processor to determine qualified vendor content in response to a service request from the customer device, wherein one or more qualified vendors for the qualified vendor content are determined, at least in part, by comparing vendor profile information for one or more vendors with information included with the service request. The instructions, when executed by a processor, cause the processor to request bids for the service request from the one or more qualified vendors by generating content for one or more qualified vendor devices that are associated with the one or more qualified vendors, wherein the content includes the service request, and wherein the content is generated for the customer device that includes the qualified vendor content. The instructions, when executed by a processor, cause the processor to generate the content for at least some of the one or more qualified vendor devices that includes a bid amount in response to receiving the bid amount from at least one of the one or more qualified vendor devices.

According to an embodiment of a system, the system includes one or more processors and one or more memory elements. The one or more memory elements include instructions, that when executed by the one or more processors, cause the one or more processors to generate service request vendor attribute content in response to a new service request inquiry from a customer device that is associated with a customer, wherein the service request vendor attribute content is based at least in part on a comparison of vendor attribute information for one or more vendor types and information included with the new service request inquiry, and wherein content is generated for the customer device that includes the service request vendor attribute content. The instructions, when executed by the one or more processors, cause the one or more processors to determine qualified vendor content in response to a service request from the customer device, wherein one or more qualified vendors for the qualified vendor content are determined, at least in part, by comparing vendor profile information for one or more vendors with information included with the service request. The instructions, when executed by the one or more processors, cause the one or more processors to request bids for the service request from the one or more qualified vendors by generating content for one or more qualified vendor devices that are associated with the one or more qualified vendors, wherein the content includes the service request, and wherein the content is generated for the customer device that includes the qualified vendor content. The instructions, when executed by the one or more processors, cause the one or more processors to generate the content for at least some of the one or more qualified vendor devices that includes a bid amount in response to receiving the bid amount from at least one of the one or more qualified vendor devices.

Those skilled in the art will recognize additional features and advantages upon reading the following detailed description, and upon viewing the accompanying drawings.

BRIEF DESCRIPTION OF THE DRAWINGS

The elements of the drawings are not necessarily to scale relative to each other. Like reference numerals designate corresponding similar parts. The features of the various illustrated embodiments can be combined unless they exclude each other. Embodiments are depicted in the drawings and are detailed in the description which follows.

FIG. 6 illustrates an embodiment of a user interface for identifying a service request for a service procurement system.

FIG. 7 illustrates an embodiment of a user interface for identifying a service request for a service procurement system.

FIG. 8 illustrates an embodiment of a user interface for identifying a service request for a service procurement system.

DETAILED DESCRIPTION

Figure 1:
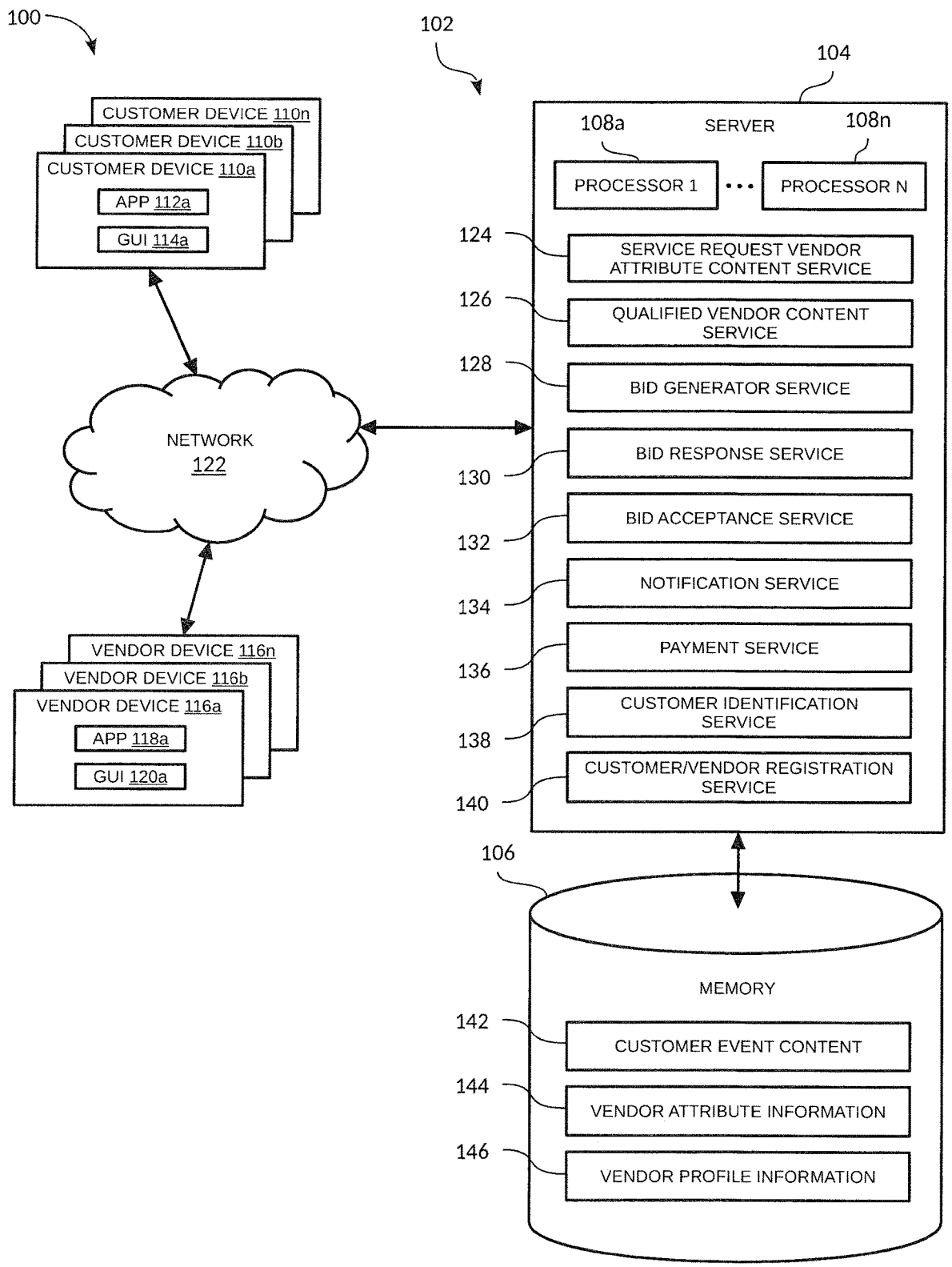
FIG. 1 illustrates a diagram of an embodiment of an environment for procuring services.

In the embodiments illustrated herein, a service procurement system is described that leverages a number of technologies including mobile technologies to match a buyer or customer for services to all vendors or sellers of services that meet the customer's service criteria. The service procurement system enables a customer to advertise his or her service needs and complete service requests for those needs that include information such as dates of service and budgets for the service. Service requests can be created by a customer for a variety of different types of vendors. The service requests can be broadcast to many registered service providers that meet service criteria such as location, budget, date and number of hours required as defined by the customer. Registered vendors would also be able to set their own criteria such as location and budget in order to filter out service requests that don't meet their needs.

In the illustrated embodiments, the service procurement system queries the underlying database and identifies the registered services providers that meet the customer's or service requestor's needs and budget for a service request. Once identified, the vendors or service providers that meet these needs and are qualified to bid (qualified vendors) can be notified in real-time, for example, on their mobile devices or via email. Only the vendors that are qualified by the service procurement system are able to submit bids for a particular service request. The service procurement system in the illustrated embodiments does not disclose the identity of a qualified vendor to the other qualified vendors that are bidding on a particular service request. Submitted bids are broadcast to the customer and the qualified vendors are able to see the bid amounts submitted by other qualified vendors. This introduces transparency into the bidding process and provides an opportunity for qualified vendors to resubmit revised bids.

In one embodiment, the service procurement system is a multi-tenant cloud based, mobile application that facilitates a reverse auction among vendors by broadcasting a customer's service request to a multitude of vendors or service providers in real time. Bids submitted by the vendors are received by the customer in real time.

In various embodiments, the service procurement system improves efficiencies between customers and vendors by streamlining the service request requirements so that a given vendor has a precise understanding of a customer's requirements. This is important because services are intangible items and prices for these services can vary greatly. Streamlining the service request criteria also enables the customer to broadcast his or her service request in a consistent manner to all service providers.

In the illustrated embodiment, service providers are needed for a wedding. The service procurement system enables a bride to properly define the attributes of their service requests and submit service requests for service areas such as wedding planning, catering, floral design, photography, videography and Disk Jockeys (DJs).

In another embodiment, service providers are needed for a home remodeling project such as for remodeling a room such as a kitchen. In this embodiment, the service procurement system enables a homeowner to properly define the attributes of their service requests and submit service requests for service areas such as flooring replacement, cabinet refinishing, counter top replacement and appliance replacement. In other embodiments, the service procurement system can be used to obtain any type or number of services that are desired.

In the illustrated embodiments, service requests submitted by customers are broadcast to multiple vendors who meet criteria set by the vendors through multiple communication channels. The service procurement system enables customers to communicate with multiple vendors through a variety of communication modes and devices while remaining anonymous. Registered vendors that are qualified by the service procurement system to bid on a service request are notified of the service request and are able to place bids on the service request. The service procurement system makes their bid amount (but not their identity) visible to other qualified vendors that have been notified of the service request. The service procurement system allows any bid from any qualified vendor to be followed up with push notifications or emails (based on preference) to all qualified vendors and the customer. In some embodiments, the customer can set a time limit to accept bids and can also accept a bid before an expiry date and close the bid. Once a bid has been accepted, all of the qualified vendors will be notified.

FIG. 1 illustrates a diagram of an embodiment of an environment for procuring services. The environment is illustrated at 100. Environment 100 includes a system 102. System 102 includes a server 104 and a memory 106. Server 104 includes one or more processors 108 illustrated at 108a-108n. Memory 106 includes one or more memory elements that store instructions that can be executed by the one or more processors 108. In various embodiments, memory 106 can include any suitable type of memory or devices such as volatile memory devices or nonvolatile memory devices. Suitable memory devices can also include DRAM, SRAM, flash memory etc. In the illustrated embodiments, a computer program product is embodied in a computer-readable storage device such as memory 106 and includes instructions that when executed by the one or more processors 108, cause the processor to execute one or more methods as described below.

In the illustrated embodiment, system 102 communicates with one or more customer devices 110a-110n and one or more vendor devices 116a-116n via a network 122. In various embodiments, any suitable number of customer devices 110a-110n or vendor devices 116a-116n can be used. In the illustrated embodiment, network 122 provides connectivity through suitable networks or communications channels. These networks or communications channels include, but are not limited to, local area networks (LANs), wide area networks (WAN), wireless local area networks (WLAN), W-Fi networks, Third Generation (3G) or Fourth Generation (4G) mobile telecommunications network, wireless cellular networks, or any combination of these. In other embodiments, other types of networks may be used. In various embodiments, suitable communications or communications channels can include short message service (SMS) notifications, push notifications, email message communications, chat addresses or any web-based service.

In the illustrated embodiment, customer devices 110a-110n and vendor devices 116a-116n can be any suitable type of computing device. In various embodiments, customer devices 110a-110n and vendor devices 116a-116n can be laptop computers, desktop computers, computer workstations, set-top digital television devices, personal digital assistants, mobile telephones or cellular smartphones. In other embodiments, customer devices 110a-110n and vendor devices 116a-116n can be other types of computing devices.

In the illustrated embodiment, customer devices 110 include graphical user interfaces (GUI) 114 and vendor devices 116 include GUIs 120. FIG. 1 illustrates customer device 110a with GUI 114a and vendor device 116a with GUI 120a. GUIs 114 and GUIs 120 enable users of respective devices 110 and 116 to receive content or notifications via network 122 that can be presented or viewed at the device and enable users to identify or enter information at the device that can be submitted by the device to network 122. Information can be presented at devices 110 and 116 using a keypad or keyboard or using touch gestures via a touch screen. Information can be presented at devices 110 and 116 by using voice instructions via a microphone within devices 110 and 116.

In the illustrated embodiment, applications (APP) 112 are installed on customer devices 110 and APPs 118 are installed on vendor devices 116. APPs 112 and 118 are software that is loaded onto customer devices 110 and vendor devices 116. APPs 112 and 118 are used to facilitate communication between devices 110 and 116 and system 102. In the illustrated embodiment, APPs 112 and 118 are a single software program that enables both customers and vendors to interact with system 102. In other embodiments, APPs 112 and APPs 118 are different software programs that are unique, respectively, to customer devices 110 and vendor devices 116. In other embodiments, one or more of customer devices 110 do not use APP 112 to communicate with system 102 via network 122, or one or more of vendor devices 116 do not use APP 118 to communicate with system 102 via network 122.

In the illustrated embodiment, environment 100 is a distributed computing environment where system 102 is a cloud computing platform that is provided as Software-as-a-Service (SaaS). Cloud service 102 is an internet-based software platform and computing service that provides shared computer processing resources, data and memory storage to customer devices 110 and vendor's devices 116 on an as-needed basis. In various embodiments, system 102 can be implemented by utilizing an object-oriented programming software language such as Java or an open-source server-side web application framework such as ASP.NET. In other embodiments scripting language such as PHP or Python can be used, or other programming languages such as C can be used. System 102 can include other components such as firewalls and load balancers that support connectivity via network 122 to customer devices 110 and vendor devices 116. In some embodiments, devices 110 and 116 access system 102 software using suitable browser clients and/or APPs 112 and 118 over the internet. Suitable browser clients include clients for devices 110 and 116 that are desktop computers, laptop computers, smart phones or tablets.

In the illustrated embodiment, server 104 includes a software engine that delivers the service procurement software web application and enables web content to be accessed via the internet using Hyper Text Transfer Protocol Secure (HTTPS) or Hyper Text Transfer Protocol (HTTP). Suitable servers used to run the web application software can include open servers such as the Java EE platform or proprietary application servers. Data used by server 104 when running the web application software is stored in memory 106. In various embodiments, memory 106 can utilize a flat model, hierarchical model, object-oriented model or a relational model for data access.

In the illustrated embodiment, customers using customer devices 110 and vendors using vendor devices 116 can log into APPs 112 and 118, respectively, to access the service procurement web application software hosted by server 104. The software services provided by the service procurement web application software includes, but is not limited to, service request vendor attribute content service 124, qualified vendor content service 126, bid generator service 128, bid response service 130, bid acceptance service 132, notification service 134, payment service 136, customer identification service 138 and customer/vendor registration service 140. In the illustrated embodiment, the stored content for system 102 includes, but is not limited to, customer event content 142, vendor attribute information 144 and vendor profile information 146.

In the illustrated embodiment, to begin using the service procurement web application software provided by system 102, customers and vendors can register using registration forms received from customer/vendor registration service 140 at their respective devices 110 and 116. Once presented at devices 110/116, the customers/vendors identify within the form the requested information and then submit the form to customer/vendor registration service 140 using the communication channel associated with the respective device 110/116. The requested information can include, but is not limited to, a first name, a last name, an email address, and a password. In other embodiments, other information can be requested and used for registration. In the illustrated embodiment, the service procurement software is configured to procure services for a wedding. The requested information in this embodiment includes identifying as a customer or as a vendor. In other embodiments, the requested information can include identifying as or registering in other suitable categories.

In the illustrated embodiment, customer/vendor registration service 140 will verify that an email address provided is not already in use by another registrant that is using the service procurement web application software. After a customer or vendor submits the form to customer/vendor registration service 140, the service procurement web application software will create a unique identification (ID) that is used to identify the customer or vendor for activities and notifications. In the illustrated embodiment, the ID is an email address. In other embodiments, other information, such as a telephone number, can be used for the ID. In the illustrated embodiment, for security purposes and for a first time activation, a Simple Mail Transfer Protocol (SMTP) email transmission service can be used to provide an email message to the user that contains an activation link for the first time activation. Once registration is complete, customer or vendors can define or set their preference for the types of notifications that are sent by the service procurement web application software provided by system 102. These notifications include, but are not limited to, SMS notifications, push notifications, email message notifications, chat notifications or notifications from any web-based service that is suitable for providing the notification.

In other embodiments, the software services provided by the service procurement web application software can be hosted on and provided by one or more of the customer devices 110 or the vendor devices 116. In these embodiments, system 102, including the functionality provided by server 104 and memory 106, is contained within at least one of a customer device 110a-110n, or at least one of a vendor device 116a-116n. This functionality includes the software services provided by the service procurement software and includes, but is not limited to, service request vendor attribute content service 124, qualified vendor content service 126, bid generator service 128, bid response service 130, bid acceptance service 132, notification service 134, payment service 136, customer identification service 138 and customer/vendor registration service 140. This functionality also includes the stored content within memory 106 and includes customer event content 142, vendor attribute information 144 and vendor profile information 146.

Figure 2:
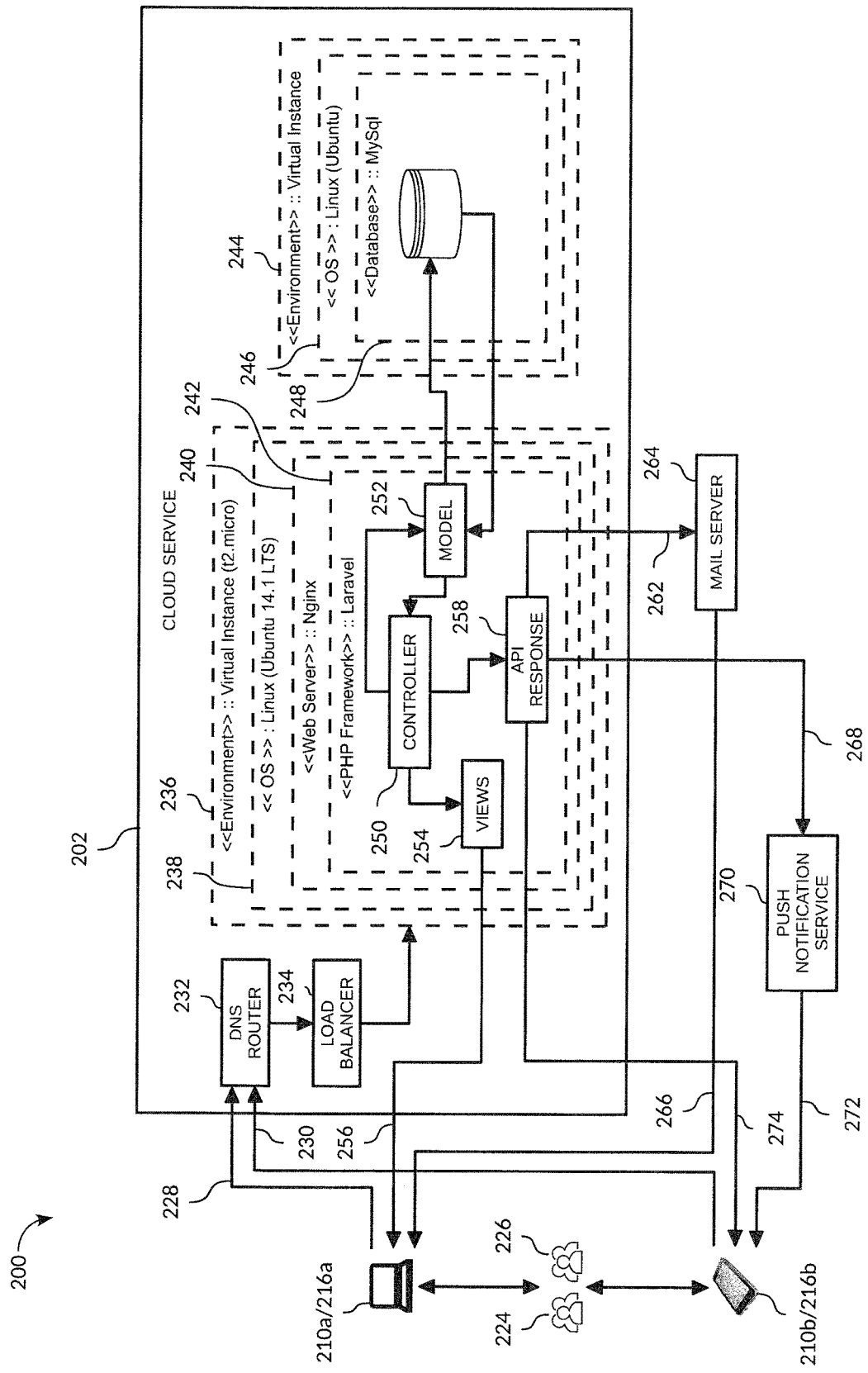
FIG. 2 illustrates a diagram of an embodiment of an environment for procuring services.

FIG. 2 illustrates a diagram of an embodiment of an environment for procuring services. The environment is illustrated at 200. System 202 hosts the service procurement web and mobile application software and the software is provided as a cloud service. Customers 224 can access cloud service 202 through an https/http browser client such as APP 112 that is installed on computers/laptops 210a or APP 112 that is installed on mobile devices 210b (see also, FIG. 1). Vendors 226 can access cloud service 202 through an https/http browser client such as APP 118 that is installed on computers/laptops 216a or APP 118 that is installed on mobile devices 216b (see also, FIG. 1). In other embodiments, customers 224 and vendors 226 can access cloud service 202 using other suitable types of devices. In the illustrated embodiment, outgoing communications from customer devices 210a/210b is routed to DNS router 232 within cloud service 202 as illustrated by communication channels 228 and 230. Outgoing communications from devices 216a/216b is routed to DNS router 232 as illustrated by communication channels 228 and 230. DNS router 232 provides a firewall which protects system 202 from outside attack and penetration with an intent to bring the system down. Load balancer 234 ensures that the communication traffic load is distributed between application environments to provide acceptable response times to customers 224 and vendors 226. Server 236 includes the software engine that delivers the web application via APP 112/118. In various embodiments, server 236 can be a virtual instance that is acquired in a public cloud service such as cloud service 202. The virtual instance is elastic in nature and if demand rises the computing environment is augmented by the virtual instance. The computing environment is supported by an Ubuntu Linux Operating System 238. Web server 240 uses Nginx which can perform load balancing and can cache content as needed. The PHP web framework 242 used is Laravel. The software services provided by server 236 includes, but is not limited to, service request vendor attribute content service 124, qualified vendor content service 126, bid generator service 128, bid response service 130, bid acceptance service 132, notification service 134, payment service 136, customer identification service 138 and customer/vendor registration service 140 (see also, FIG. 1).

In the illustrated embodiment, database server 244 is used to provide data and to store information that is used by server 236. In various embodiments, server 244 can be a virtual instance that is acquired in a public cloud service such as cloud service 202. The database operating system 246 is Ubuntu Linux and the underlying database 248 is MySql. The stored content provided by database server 244 includes, but is not limited to, customer event content 142, vendor attribute information 144 and vendor profile information 146.

In the illustrated embodiment, the application is developed and delivered using the Model-View-Controller design pattern. The controller 250 send commands to model 252 to update the state of model 252. Controller 250 can also send commands to its associated views at 254 to control and change the presentation of information that is provided via communication channel 256 to devices 210a/216a. The system includes one or more discrete APIs 258 which are utilized by APPs 112 and 118 (see also, FIG. 1). Controller 250 sends appropriate information or responses to APIs 258. APIs 258 forward the information or responses to mobile devices 210b/216b via communication channel 274. Controller 250 can also send commands to its associated views 254 to change the presentation of information that is provided via communication channel 256 to devices 210a/216a. Model 252 interacts with database 248 and stores data or information that can be retrieved in accordance with commands provided by controller 250. The retrieved information can be displayed within views 254. Views 254 creates a presentation layer that is based on changes within model 252.

In the illustrated embodiment, email notification responses are sent to an external mail server 264 via communication channel 262. Mail server 264 sends the email notification responses via communication channel 266 to devices 210a/216a. Push notification responses are sent via communication channel 268 to push notification service 270. Push notification service 270 sends the push notification responses via communication channel 272 to mobile devices 210b/216b.

In the illustrated embodiment, communications channels 228, 230, 256, 262, 266, 268, 272 and 274 are provided via the internet or via a network such as network 122. In other embodiments, one or more of communications channels 228, 230, 256, 262, 266, 268, 272 and 274 can be direct physical connections. In other embodiments, communications channels 228, 230, 256, 262, 266, 268, 272 and 274 can be provided using other suitable types of connections.

Figure 3:
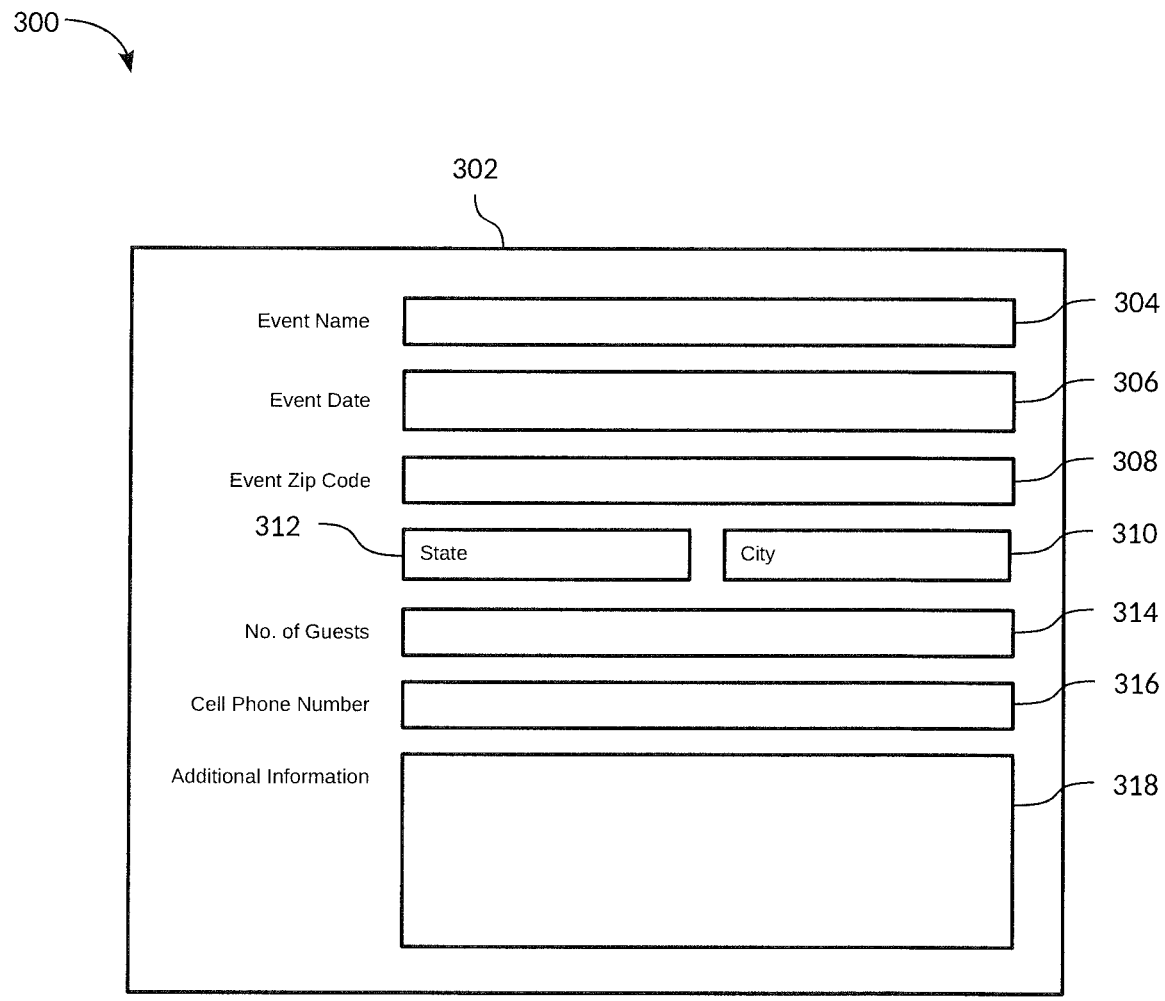
FIG. 3 illustrates an embodiment of a user interface for identifying an event for a service procurement system.
Figure 4:
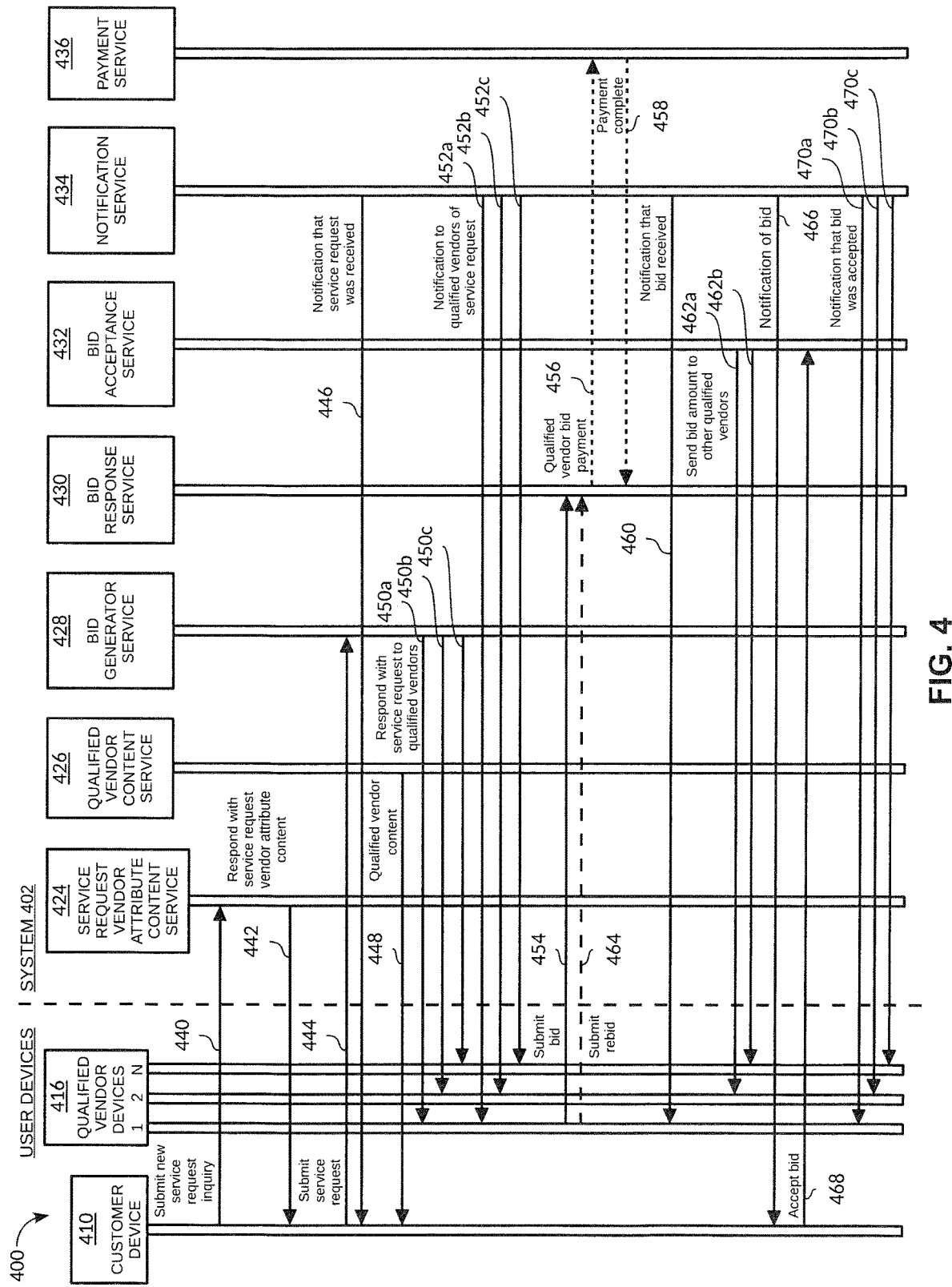
FIG. 4 illustrates a sequence diagram of a process for procuring services.

FIG. 3 illustrates an embodiment at 300 of a user interface 302 for identifying an event for a service procurement system. Referring also to FIG. 1, user interface 302 is rendered on a customer device 110 and information is displayed, identified and submitted as a service request to system 102. In some embodiments, the information is identified and submitted via APP 112 and/or GUI 114. In the illustrated embodiment, a customer can create an event by identifying customer event content 142 that includes one or more of an event name at 304, an event date at 306 and an event zip code at 308. In some embodiments, additional event content can be entered that includes an event city at 310, an event state at 312, a number of guests at 314 and a cell phone number at 316. In some embodiments, additional information can be provided at 318 that relates to the nature of the event and helps a prospective vendor gain a better understanding of the event. In the illustrated embodiment, each customer can create more than one event. In one embodiment, the event date has to be at least 30 days from the date that the event was created and cannot be more than 365 days from the date the event was created. In other embodiments, other suitable numbers of days or event date limitations can be used. In the illustrated embodiment, a customer can submit the customer event content identified within user interface 302 to system 102 to be stored in memory 106 at customer event content 142. Referring also to FIG. 4, in some embodiments, some or all of the information required for a service request, including but not limited to, a service request budget and a service request location, can be included in customer event content 142 and does not need to be identified or completed within the information fields of a service request vendor attribute form by a customer.

FIG. 4 illustrates a sequence diagram of a process for procuring services. The diagram is illustrated at 400 and includes user devices illustrated as a customer device 410 and qualified vendor devices 416 and includes a system 402. In various embodiments, system 402 can be system 102 as illustrated in FIG. 1 or cloud service system 202 as illustrated in FIG. 2. In other embodiments, system 402 can be a distributed system wherein one or more services and associated information stored in memory can be distributed amongst a plurality of systems such as system 102, cloud service system 202, or be within a user device such as customer device 410 or a vendor device 416.

At 440, a customer identifies a new service request inquiry at customer device 410 and submits the new service request inquiry from customer device 410 to system 402. In the illustrated embodiment, content is presented at customer device 410 that allows the customer to select a service category from a number of service categories for vendors. In this embodiment, the service categories include a wedding planner, a Disk Jockey (DJ), a photographer and a videographer. In other embodiments, the service categories can include other suitable types of vendors. After identifying a service category from the number of service category, the customer submits the new service request inquiry that includes information which is the selected service category to system 402.

Referring also to FIG. 1 and FIG. 3, in some embodiments, once a customer has created an event, any number of service requests can be created for vendor services that are related to the event. The customer creates an event by identifying or specifying customer event content 142 where the customer event content 142 includes one or more of an event name at 304, an event date at 306 and an event zip code at 308. In some embodiments, additional event content can be entered that includes an event city at 310, an event state at 312, a number of guests at 314 and a cell phone number at 316.

In the illustrated embodiment, qualified vendor content service 426 generates service request vendor attribute content in response to the new service request inquiry received at 440 from customer device 410. Referring also to FIG. 1, the service request vendor attribute content is based at least in part on a comparison of vendor attribute information 144 for one or more vendor types and information included with the new service request inquiry. The information included with the new service request inquiry includes a service category. In other embodiments, the information can include multiple service categories. In the illustrated embodiment, service request vendor attribute content service 424 compares the service category with service categories corresponding to vender attribute information 144 and generates service request vendor attribute content that corresponds to the service category. At 442, service request vender attribute content service 424 responds with service request vender attribute content that is sent via a communication channel to customer device 410. In the illustrated embodiment, the service request vendor attribute content is a form that is presented at customer device 410 that includes information fields that are to be identified or completed by the customer. This form, once completed and submitted to system 402, constitutes a service request that system 402 utilizes to identify qualified vendors.

Figure 5:
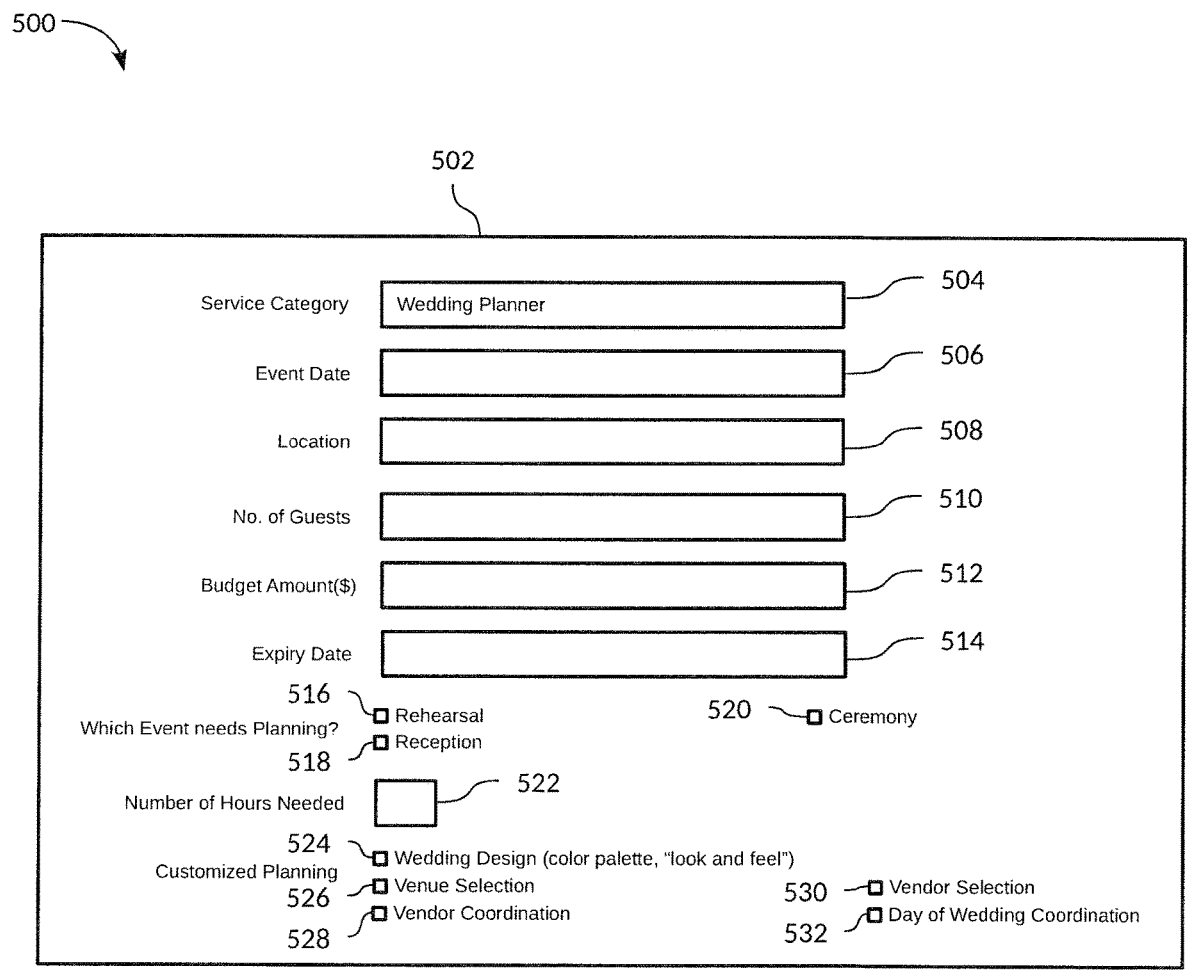
FIG. 5 illustrates an embodiment of a user interface for identifying a service request for a service procurement system.

In the illustrated embodiment, the customer identifies or completes the information fields at customer device 410 where the information that is identified at customer device 410 includes a service request budget and a service request location. The service request budget represents a maximum amount that a customer is willing to spend for a vendor's services. The service request location represents a location where the vendor's services are required. The information can also include a service request date and other information that may be helpful for a qualified vendor to determine whether to submit a bid for the service request. FIG. 5 illustrates an embodiment of service request vendor attribute content for a wedding planner, FIG. 6 illustrates an embodiment of service request vendor attribute content for a DJ, FIG. 7 illustrates an embodiment of service request vendor attribute content for a photographer and FIG. 8 illustrates an embodiment of service request vendor attribute content for a videographer.

In some embodiments, some or all of the information required for the service request, such as a service request budget and a service request location, is included in the customer event content 142 and does not need to be identified or completed within the information fields of the service request vendor attribute form by the customer at customer device 410. In these embodiments, generating service request vendor attribute content includes storing customer event content 142 before generating the service request vendor attribute content. The service request vendor attribute content is generated based at least in part on the customer event content 142. In some embodiments, the customer event content 142 includes one or more of an event date, an event location and a guest count.

In the illustrated embodiment, at 444, the customer identifies the service request at customer device 410 and submits the service request from customer device 410 via a communication channel to bid generator service 428 within system 402. At 446, notification service 434 sends notification to customer device 410 that indicates that the service request was received by system 402. In various embodiments, the notification can include, but is not limited to, a SMS notification, a push notification, an email message notification, a chat notification, or any web-based service that is suitable for providing the notification. In the illustrated embodiment, one or more notifications are sent to customer device 410 based on a notification preference included for the customer within customer event content 142 (see also, FIG. 1).

At 448, qualified vendor content service 426 determines qualified vendor content in response to receiving the service request from customer device 410 and sends the qualified vendor content to customer device 410 via a communication channel. One or more qualified vendors for the qualified vendor content are determined, at least in part, by comparing vendor profile information for one or more vendors with the information included with the service request. Referring also to FIG. 1, vendor profile information 146 is provided by the vendors to customer/vendor registration service 140 during registration and is stored in memory 106 for use by system 402 in determining qualified vendors. The vendor profile information for the one or more vendors includes a vendor budget, a vendor travel distance and a vendor location. The vendor budget represents a minimum amount that the vendor is willing to provide services for. For example, if the vendor prefers to provide services for larger (and more expensive) events, specifying the vendor budget will improve efficiency of the bidding process by matching vendors only with customers that have spending budgets that are sufficient to meet the vendors requirements. The vendor travel distance represents a maximum distance that a vendor is willing to travel to provide services for an event. The vendor location is a zip code and can also include a city and state. The vendor location is used to determine a vendor travel distance for a vendor between the vendor's location and a location identified in the service request. In various embodiments, the vendor location can be a business or residence location for the vendor.

In the illustrated embodiment, qualified vendor content service 426 identifies one or more qualified vendors by determining, for each one of the one or more vendors, if a distance between the vendor location and the service request location is equal to or less than the vendor travel distance and if the vendor budget is equal to or less than the service request budget. Qualified vendor content service 426 sends the qualified vendor content via a communication channel to customer device 410 where the qualified vendor content is presented or displayed at customer device 410. The qualified vendor content can include one or more of a vendor name, a vendor business name, and a vendor address or location.

At 450a-450c, bid generator service 428 sends a request for bid for the service request to one or more qualified vendors by generating content for one or more qualified vendor devices 416 that are associated with the one or more qualified vendors. The content includes the service request. Illustrated are three qualified vendor devices 416 designated at 1, 2 and N, where N represents any suitable number of qualified vendor devices. For purposes of discussion, the qualified vendor devices illustrated in FIG. 4 are referred to as qualified vendor device 416-1, qualified vendor device 416-2 and qualified vendor device 416-N. In various embodiments, there is only one qualified vendor and one qualified vendor device 416, two qualified vendors and two qualified vendor devices 416 or any number N of qualified vendors and qualified vendor devices 416. The service request is presented or displayed at the qualified vendor devices 416.

At 452a-452c, notification service 434 sends a notification to qualified vendor devices 416-1, 416-2 and 416-N to alert the qualified vendors that a request for bid for the service request has been sent to their respective qualified vendor devices 416-1, 416-2 and 416-N via communication channels associated with the qualified vendor devices 416-1, 416-2 and 416-N. In various embodiments, the notifications can include, but are not limited to, a SMS notification, a push notification, an email message notification, a chat notification, or any web-based service that is suitable for providing the notification. In the illustrated embodiment, one or more notifications are sent to each of qualified vendor devices 416-1, 416-2 and 416-N based on a notification preference included for the corresponding qualified vendors within vendor profile information 146 (see also, FIG. 1).

At 454, one of the qualified vendors identifies a bid amount at qualified vendor device 416-1 and submits the bid amount from qualified vendor device 416-1 to bid response service 430 using a communication channel associated with the qualified vendor device 416-1. Although only one qualified vendor is illustrated in FIG. 4 as submitting a bid amount, in other embodiments, any number of the qualified vendors can identify and submit a bid amount from qualified vendor devices 410. For example, in one embodiment, two qualified vendors identify and submit bid amounts from their respective qualified vendor devices 416-1 and 410-2.

In the illustrated embodiment, bid response service 430 initiates a qualified vendor bid payment at 456 to payment service 436 when the bid is submitted at 454 from qualified vendor device 416-1. For the privilege of biding on service requests, for each bid submitted by a qualified vendor via a corresponding qualified vendor device 416, a nominal service fee is charged and processed by payment service 436. If payment is not successfully made by the qualified vendor via payment service 436, the bid submitted by the qualified vendor is rejected. In the illustrated embodiment, at 458, the payment is complete and notification is send to bid response service 430. In other embodiments, payment service 436 is not used. In the illustrated embodiment, at 460, notification that the bid has been received and the payment successfully processed is sent to qualified vendor device 416-1 via a communication channel associated with qualified vendor device 416-1. In various embodiments, this notification can include, but is not limited to, a SMS notification, a push notification, an email message notification, a chat notification, or any web-based service that is suitable for providing the notification. In the illustrated embodiment, one or more notifications are sent to qualified vendor device 416-1 based on a notification preference included for the qualified vendor within vendor profile information 146 (see also, FIG. 1).

In the illustrated embodiment, content is generated at 462a by bid acceptance service 432 for qualified vendor device 416-2 and content is generated at 462b by bid acceptance service 432 for qualified vendor device 416-N in response to receiving the bid at 454 from qualified vendor device 416-1. The content that is generated includes the amount of the bid submitted at 454 by qualified vendor device 416-1. For each bid submitted by a qualified vendor device 416, bid acceptance service 432 provides the bid amount to the other qualified vendor devices 416 to promote competition amongst the qualified vendors bidding on the service request. For example, if bids were submitted by multiple qualified vendors via their respective qualified vendor devices 416, any one or more of the qualified vendors can submit rebids, for example, that have a lower bid amount, via their respective qualified vendor devices as illustrated at 464.

In the illustrated embodiment, at 466, notification that a bid has been made at 454 is sent to customer device 410 via a communication channel associated with customer device 410. In various embodiments, the notification can include, but is not limited to, a SMS notification, a push notification, an email message notification, a chat notification, or any web-based service that is suitable for providing the notification. In the illustrated embodiment, one or more notifications are sent to customer device 410 based on a notification preference included for the customer within customer event content 142 (see also, FIG. 1).

At 468, a customer identifies acceptance at customer device 410 of the bid submitted at 454. In response, bid acceptance service 432 notifies the qualified vendors via notification service 434 that bidding on the service request has been closed. In the illustrated embodiment, notification is sent at 470a to qualified vendor device 416-1, notification is sent at 470b to qualified vendor device 416-2 and notification is sent at 470c to qualified vendor device 416-N. In various embodiments, notifications sent at 470a-470c can each include, but are not limited to, a SMS notification, a push notification, an email message notification, a chat notification, or any web-based service that is suitable for providing the notification. In the illustrated embodiment, the one or more notifications that are sent to each of qualified vendor devices 416-1, 416-2 and 416-N are sent based on a notification preference included for the respective qualified vendors within vendor profile information 146 (see also, FIG. 1).

In the embodiment illustrated in FIG. 4, notification service 434 sends notifications at 446, 452a-452c, 460, 466 and 470a-470c. In various embodiments, preferences for each of these notifications can be set by the customer for customer device 410 and by the qualified vendors for respective qualified vendor devices 416-1, 416-2 and 416-N. For example, the preferences could be set based on priority or importance. For example, notification that a service request was received at 446 for customer device 410 could be sent via a SMS notification but notification of a bid at 466 could be sent via an SMS notification and an email notification. Similarly, notification that a bid was received and successfully processed at 460 for qualified vendor device 416-1 could be sent via an SMS notification and a chat notification and notification that a bid was accepted at 470a for qualified vendor device 416-1 could be sent via an SMS notification, a push notification, an email message notification and a chat notification.

FIG. 5 illustrates an embodiment at 500 of a user interface 502 for identifying a service request for a service procurement system. Referring also to FIG. 1, user interface 502 is rendered on a customer device 110 and information is displayed, identified and submitted as a service request to system 102. In some embodiments, the information is identified and submitted via APP 112 and GUI 114. In the illustrated embodiment, user interface 502 includes information fields for a "Service Category" that is a wedding planner at 504. The information fields include a service request budget or "Budget Amount ($)" at 512 and a service request location or "Location" at 508. The service request budget represents a maximum amount that a customer is willing to spend for a vendor's services. The service request location represents a location where the vendor's services are required. The information can also include a service request date or event date at 506, a guest count or number of guests at 510, and a service request or bid expiration date at 514.

In the illustrated embodiment, additional information fields are included for user interface 502. Customer selectable information fields are illustrated for the specific event that needs planning and includes a rehearsal at 516, a reception at 518 and a ceremony at 520. A number of hours required for the wedding planner services can be identified at 522. For customized wedding planning, customer selectable information fields include wedding design at 524, venue selection at 526, vendor coordination at 528, vendor selection at 530 and day of wedding coordination at 532. In other embodiments, any one or more of the information fields illustrated in user interface 502 can be used by qualified vendor content service 426 to identify qualified vendors that can submit bids for the service request (see also, FIG. 4).

FIG. 6 illustrates an embodiment at 600 of a user interface 602 for identifying a service request for a service procurement system. Referring also to FIG. 1, user interface 602 is rendered on a customer device 110 and information is displayed, identified and submitted as a service request to system 102. In some embodiments, the information is identified and submitted via APP 112 and GUI 114. In the illustrated embodiment, user interface 602 includes information fields for a recorded music provider or "DJ" at 604. The information fields include a service request budget or "Budget Amount ($)" at 612 and a service request location or "Location" at 608. The service request budget represents a maximum amount that a customer is willing to spend for a vendor's services. The service request location represents a location where the vendor's services are required. The information can also include a service request date or event date at 606, a guest count or number of guests at 610, and a service request or bid expiration date at 614.

In the illustrated embodiment, additional information fields are included for user interface 602. Customer selectable information fields are illustrated for the type of music desired and includes pop at 616, rock at 618, R&B soul at 620, hip-hop/rap at 622, EDM/house/club at 624, top 40 at 626, Latin at 628, country at 630 and an other category at 632. User selectable information fields are illustrated for an indoor or outdoor venue selection and includes indoors at 634, outdoors at 636, an "I'm not sure" category at 638, and an "Other" category at 640. Customer selectable information fields are illustrated to specify whether the venue that the DJ will be performing at provides sound equipment and includes yes at 642 and no at 644. Customer selectable information fields are illustrated to specify additional equipment or services provided and includes MC at 646, microphones at 648 an "Other" category at 650, lighting at 652 and a fog machine at 654. The information field illustrated at 656 is it optional and allows the customer to enter any additional information that the customer believes the DJ should know in order provide the services. In other embodiments, any one or more of the information fields illustrated in user interface 602 can be used by qualified vendor content service 426 to identify qualified vendors that can submit bids for the service request (see also, FIG. 4).

FIG. 7 illustrates an embodiment at 700 of a user interface 702 for identifying a service request for a service procurement system. Referring also to FIG. 1, user interface 702 is rendered on a customer device 110 and information is displayed, identified and submitted as a service request to system 102. In some embodiments, the information is identified and submitted via APP 112 and GUI 114. In the illustrated embodiment, user interface 702 includes information fields for a photographer at 704. The information fields include a service request budget or "Budget Amount ($)" at 712 and a service request location or "Location" at 708. The service request budget represents a maximum amount that a customer is willing to spend for a vendor's services. The service request location represents a location where the vendor's services are required. The information can also include a service request date or event date at 706, a guest count or number of guests at 710, and a service request or bid expiration date at 714.

In the illustrated embodiment, additional information fields are included for user interface 702. Customer selectable information fields are illustrated for the number of hours that the photographer's services are required for and includes four hours at 716, six hours at 718, eight hours at 720 and an "Other" category at 722. Customer selectable information fields are illustrated for the event that the photographer's service is required for and includes the wedding ceremony at 724 and the wedding reception at 726. Customer selectable information fields are illustrated for whether the photographer will take pictures of the engagement and includes yes at 728 and no at 730. Customer selectable information fields illustrated for whether the photographer will need to provide a picture album and includes yes at 732 and no at 734. In other embodiments, any one or more of the information fields illustrated in user interface 702 can be used by qualified vendor content service 426 to identify qualified vendors that can submit bids for the service request (see also, FIG. 4).

FIG. 8 illustrates an embodiment at 800 of a user interface 802 for identifying a service request for a service procurement system. Referring also to FIG. 1, user interface 802 is rendered on a customer device 110 and information is displayed, identified and submitted as a service request to system 102. In some embodiments, the information is identified and submitted via APP 112 and GUI 114. In the illustrated embodiment, user interface 802 includes information fields for a videographer at 804. The information fields include a service request budget or "Budget Amount ($)" at 812 and a service request location or "Location" at 808. The service request budget represents a maximum amount that a customer is willing to spend for a vendor's services. The service request location represents a location where the vendor's services are required. The information can also include a service request date or event date at 806, a guest count or number of guests at 810, and a service request or bid expiration date at 814.

In the illustrated embodiment, additional information fields are included for user interface 802. Customer selectable information fields are illustrated for the type of event that the videographer's service is required for and includes the engagement at 816, the wedding ceremony at 818 and the wedding reception at 820. Customer selectable information fields are illustrated for the type of location and includes indoor at 822 and outdoor at 824. Customer selectable information fields are illustrated for the number of hours that the videographer's services are required for and includes 6-8 hours at 826, 8-10 hours at 828 and 10-12 hours at 830. Customer selectable information fields are illustrated for the type of video that the customer desires and includes raw footage at 832, highlight video at 834, full-feature video at 836 and an "Other" category at 838. Customer selectable information fields are illustrated for whether additional services are needed and includes yes at 840 and no at 842. In other embodiments, any one or more of the information fields illustrated in user interface 802 can be used by qualified vendor content service 426 to identify qualified vendors that can submit bids for the service request (see also, FIG. 4).

Figure 9:
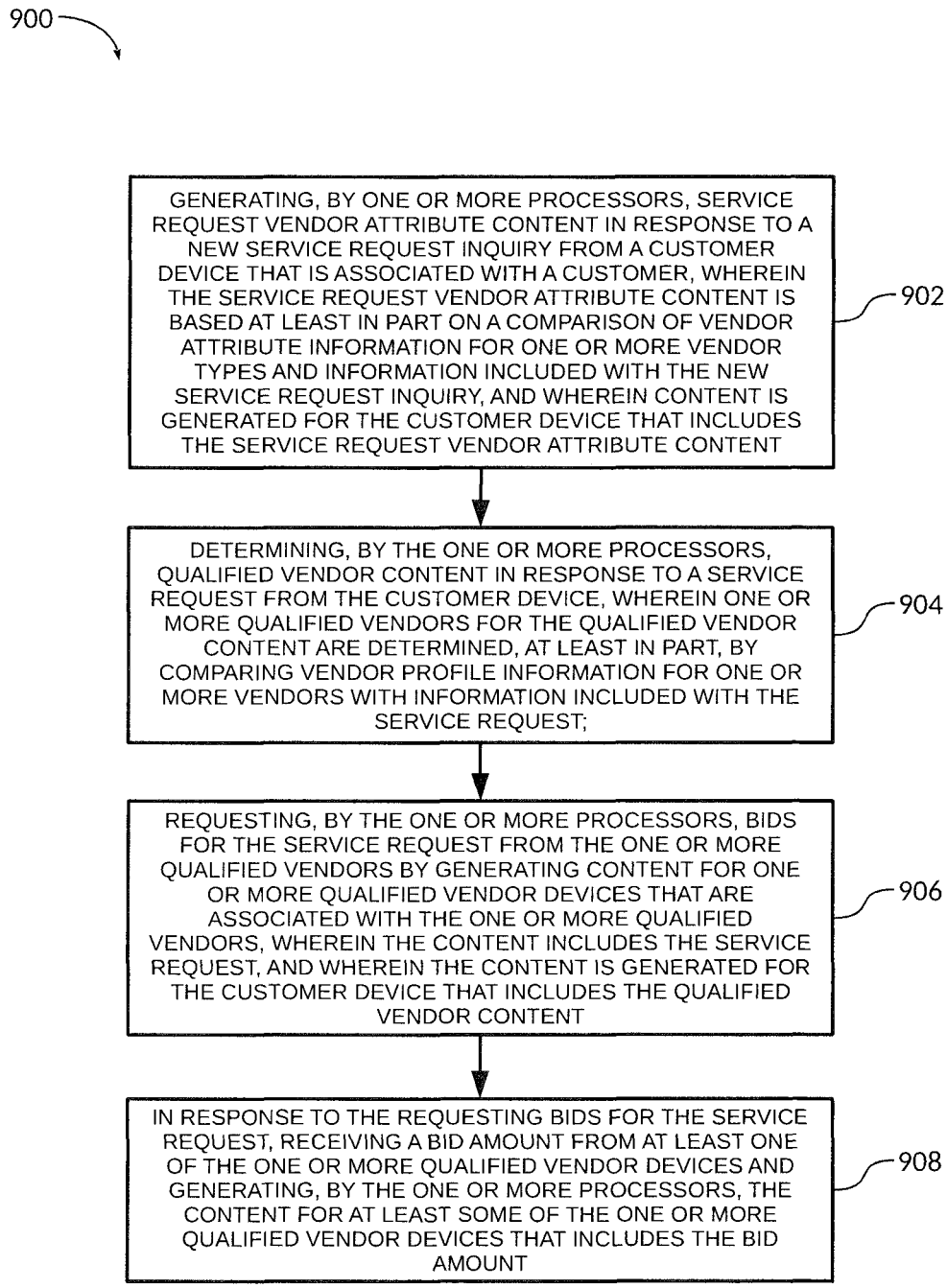
FIG. 9 illustrates a flowchart of an embodiment of a method of procuring services.

FIG. 9 illustrates a flowchart of an embodiment of a method of procuring services. The method is illustrated at 900. At 902, the method includes generating, by one or more processors, service request vendor attribute content in response to a new service request inquiry from a customer device that is associated with a customer, wherein the service request vendor attribute content is based at least in part on a comparison of vendor attribute information for one or more vendor types and information included with the new service request inquiry, and wherein content is generated for the customer device that includes the service request vendor attribute content.

At 904, the method includes determining, by the one or more processors, qualified vendor content in response to a service request from the customer device, wherein one or more qualified vendors for the qualified vendor content are determined, at least in part, by comparing vendor profile information for one or more vendors with information included with the service request.

At 906, the method includes requesting, by the one or more processors, bids for the service request from the one or more qualified vendors by generating content for one or more qualified vendor devices that are associated with the one or more qualified vendors, wherein the content includes the service request, and wherein the content is generated for the customer device that includes the qualified vendor content.

At 908, the method includes, in response to the requesting bids for the service request, receiving a bid amount from at least one of the one or more qualified vendor devices and generating, by the one or more processors, the content for at least some of the one or more qualified vendor devices that includes the at least one bid amount.

Spatially relative terms such as "under", "below", "lower", "over", "upper" and the like, are used for ease of description to explain the positioning of one element relative to a second element. These terms are intended to encompass different orientations of the device in addition to different orientations than those depicted in the figures. Further, terms such as "first", "second", and the like, are also used to describe various elements, regions, sections, etc. and are also not intended to be limiting. Like terms refer to like elements throughout the description.

As used herein, the terms "having", "containing", "including", "comprising" and the like are open ended terms that indicate the presence of stated elements or features, but do not preclude additional elements or features. The articles "a", "an" and "the" are intended to include the plural as well as the singular, unless the context clearly indicates otherwise.

With the above range of variations and applications in mind, it should be understood that the present invention is not limited by the foregoing description, nor is it limited by the accompanying drawings. Instead, the present invention is limited only by the following claims and their legal equivalents.

What is claimed is:

1. A method, comprising:

submitting, over a network, from a customer device that is associated with a customer to one or more processors that includes a memory, a new service request inquiry, wherein the new service request inquiry includes information identified or entered by the customer via a Graphical User Interface (GUI) on the customer device that identifies one or more service categories;

generating, by the one or more processors, service request vendor attribute content in response to receiving the new service request inquiry from the customer device, wherein the service request vendor attribute content is based at least in part on a comparison of vendor attribute stored in the memory for one or more vendor service categories and the information included with the new service request inquiry that identifies the one or more service categories, wherein the service request vendor attribute content includes a user interface to be rendered on the GUI of the customer device as a service request having information fields that are unique for each one of the one or more vendor service categories, wherein content is generated for the customer device that includes the service request vendor attribute content with the service request for each one of the one or more vendor service categories that correspond with the one or more service categories identified by the customer, and wherein the service request vendor attribute content is sent, over the network, by the one or more processors to the customer device;

sending, over the network, from the customer device to the one or more processors, the service request for at least one of the one or more vendor service categories, wherein the service request includes service information identified or entered by the customer into the information fields via the GUI of the customer device;

determining, by the one or more processors, qualified vendor content in response to receiving the service request from the customer device, wherein one or more qualified vendors for the qualified vendor content are determined, at least in part, by comparing vendor profile information stored in the memory for one or more vendors with the service information within the information fields of the service request;

sending, over the network, from the one or more processors to one or more qualified vendor devices that are associated with the one or more qualified vendors, a request for bids for the service request from the one or more qualified vendors by generating content for the one or more qualified vendor devices, wherein the content includes the service request;

sending, over the network, from the one or more processors to the customer device, the qualified vendor content that includes the one or more qualified vendors;

in response to the request for bids for the service request, receiving, over the network, a bid amount from at least one of the one or more qualified vendor devices, wherein the bid amount is identified or entered by the one or more qualified vendors associated with the at least one of the one or more qualified vendor devices into the content that includes the service request via a GUI of the at least one of the one or more qualified vendor devices, and generating, by the one or more processors, a request for rebids that includes the bid amount, wherein the request for rebids that includes the bid amount, is sent, over the network, from the one or more processors to the one or more qualified vendor devices to invite any of the one or more qualified vendors to submit another bid amount that is lower than the bid amount; and submitting, over the network, from the customer device to the one or more processors, an acceptance of the bid amount or the another bid amount, wherein the acceptance of the bid amount or the another bid amount includes information identified or entered by the customer via the GUI on the customer device.

2. The method of claim 1, wherein generating service request vendor attribute content further comprises the one or more processors storing customer event content before generating the service request vendor attribute content, wherein the customer event content includes the one or more service categories identified or entered by the customer via a user interface rendered on the GUI of the customer device and includes event information identified or entered by the customer into event information fields within the user interface via the GUI of the customer device, wherein the customer event content is sent, via the network, from the customer device to the one or more processors and stored by the one or more processors in the memory as the customer event content, wherein the service request vendor attribute content is generated based at least in part on the customer event content, and wherein the customer event content includes one or more of a budget, an event date, an event location and a guest count.

3. The method of claim 1, wherein the vendor profile information for the one or more vendors includes a vendor budget, a vendor travel distance and a vendor location, and wherein the information included with the service request for at least one of the one or more vendor service categories includes a service request budget and a service request location, and wherein determining the one or more qualified vendors comprises:

determining, by the one or more processors, for each one of the one or more vendors, if a distance between the vendor location and the service request location is equal to or less than the vendor travel distance and if the vendor budget is equal to or less than the service request budget; and identifying the qualified vendors in response to determining the one or more vendors where the distance between the vendor location and the service request location is equal to or less than the vendor travel distance and the vendor budget is equal to or less than the service request budget.

4. The method of claim 1, wherein determining the qualified vendor content comprises:

identifying or entering in the information fields of the service request for the at least one of the one or more vendor service categories via the GUI of the customer device, the service information within the information fields of the service request, the service information including a customer budget amount, a customer event location and an event date;

submitting the service request for the at least one of the one or more vendor service categories from the customer device via the network to the one or more processors and determining, by the one or more processors, from the vendor profile information stored in the memory that includes a vendor budget, a vendor travel distance and a vendor location for the one or more vendors, the one or more qualified vendors by determining, for the one or more vendors within the at least one of the one or more vendor service categories, the one or more qualified vendors that have a distance between the vendor location and the service request location that is equal to or less than the vendor travel distance and have the vendor budget that is equal to or less than the service request budget.

5. The method of claim 4, further comprising:

after submitting the service request for the at least one of the one or more vendor service categories from the customer device, receiving, over the network from the one or more processors at the customer device, one or more of an email message, a push notification or a short message service notification that indicates that the service request for the one or more processors has been received by the one or more processors.

6. The method of claim 1, wherein requesting the bids for the service request further comprises:

receiving the service request for the at least one of the one or more vendor service categories at the at least one of the one or more qualified vendor devices;

presenting the service request on the GUI of the at least one of the one or more qualified vendor devices;

identifying, on the GUI of the at least one of the one or more qualified vendor devices, a bid amount; and submitting the bid amount from the at least one of the one or more qualified vendor devices over the network to the one or more processors.

7. The method of claim 6, wherein receiving the service request for the at least one of the one or more vendor service categories further comprises:

receiving at the at least one of the one or more qualified vendor devices, one or more of an email message, a push notification or a short message service notification that indicates that the service request has been received by the at least one of the one or more qualified vendor devices.

8. The method of claim 6, further comprising:
after submitting the bid amount, receiving at the at least one of the one or more qualified vendor devices, one or more of an email message, a push notification or a short message service notification that indicates that the bid amount has been received by the one or more processors.

9. A computer program product embodied in a computer-readable storage device and comprising instructions that when executed by a processor, cause the processor to:
submit, over a network, from a customer device that is associated with a customer to the processor that includes a memory, a new service request inquiry, wherein the new service request inquiry includes information identified or entered by the customer via a Graphical User Interface (GUI) on the customer device that identifies one or more service categories;
generate service request vendor attribute content in response to receiving the new service request inquiry from the customer device, wherein the service request vendor attribute content is based at least in part on a comparison of vendor attribute information stored in the memory for one or more vendor service categories and the information included with the new service request inquiry that identifies the one or more service categories, wherein the service request vendor attribute content includes a user interface to be rendered on the GUI of the customer device as a service request having information fields that are unique for each one of the one or more vendor service categories, wherein content is generated for the customer device that includes the service request vendor attribute content with the service request for each one of the one or more vendor service categories that correspond with the one or more service categories identified by the customer, and wherein the service request vendor attribute content is sent, over the network, by the one or more processors to the customer device;
send, over the network, from the customer device to the one or more processors, the service request for at least one of the one or more vendor service categories, wherein the service request includes service information identified or entered by the customer into the information fields via the GUI of the customer device;
determine, by the processor, qualified vendor content in response to receiving the service request from the customer device, wherein one or more qualified vendors for the qualified vendor content are determined, at least in part, by comparing vendor profile information stored in the memory for one or more vendors with the service information within the information fields of the service request;
send, over the network, from the processor to one or more qualified vendor devices that are associated with the one or more qualified vendors, a request for bids for the service request from the one or more qualified vendors by generating content for the one or more qualified vendor devices, wherein the content includes the service request;
send, over the network, from the processor to the customer device, the qualified vendor content that includes the one or more qualified vendors;
generate, by the processor, a request for rebids that includes a bid amount, wherein the request for rebids that includes the bid amount, is sent, over the network, from the processor to the one or more qualified vendor devices to invite any of the one or more qualified vendors to submit another bid amount that is lower than the bid amount, wherein the request for rebids that includes the bid amount is generated in response to receiving, over the network, the bid amount from at least one of the one or more qualified vendor devices, wherein the bid amount is identified or entered by the one or more qualified vendors associated with the at least one of the one or more qualified vendor devices into the content that includes the service request via a GUI of the at least one of the one or more qualified vendor devices; and
submit, over the network, from the customer device to the processor, an acceptance of the bid amount or the another bid amount, wherein the acceptance of the bid amount or the another rebid amount includes information identified or entered by the customer via the GUI on the customer device.

10. The computer program product of claim 9, wherein generating service request vendor attribute content further comprises the processor storing customer event content before generating the service request vendor attribute content, wherein the customer event content includes the one or more service categories identified or entered by the customer via a user interface rendered on the GUI of the customer device and includes event information identified or entered by the customer into information fields within the user interface via the GUI of the customer device, wherein the customer event content is sent, via the network, from the customer device to the processor and stored by the processor in the memory as the customer event content, wherein the service request vendor attribute content is generated based at least in part on the customer event content, and wherein the customer event content includes one or more of a budget, an event date, an event location and a guest count.

11. The computer program product of claim 9, wherein the vendor profile information for the one or more vendors includes a vendor budget, a vendor travel distance and a vendor location, and wherein the information included with the service request for at least one of the one or more vendor service categories includes a service request budget and a service request location, and wherein determining the one or more qualified vendors comprises:
determining, by the processor, for each one of the one or more vendors, if a distance between the vendor location and the service request location is equal to or less than the vendor travel distance and if the vendor budget is equal to or less than the service request budget; and
identifying the qualified vendors in response to determining the one or more vendors where the distance between the vendor location and the service request location is equal to or less than the vendor travel distance and the vendor budget is equal to or less than the service request budget.

12. The computer program product of claim 9, wherein determining the qualified vendor content comprises:
identifying or entering in the information fields of the service request for the at least one of the one or more vendor service categories via the GUI of the customer device, the service information within the information fields of the service request, the service information including a customer budget amount, a customer event location and an event date;
submitting the service request for the at least one of the one or more vendor service categories from the customer device over the network to the processor and determining, by the processor, from the vendor profile information stored in the memory that includes a vendor budget, a vendor travel distance and a vendor location for the one or more vendors, the one or more qualified vendors by determining, for the one or more vendors within the at least one of the one or more vendor service categories, the one or more qualified vendors that have a distance between the vendor location and the service request location that is equal to or less than the vendor travel distance and have the vendor budget that is equal to or less than the service request budget.

13. The computer program product of claim 12, further comprising:
after submitting the service request for the at least one of the one or more vendor service categories from the customer device, receiving, over the network from the processor at the customer device, one or more of an email message, a push notification or a short message service notification that indicates that the service request for the processor has been received by the processor.

14. The computer program product of claim 9, wherein requesting the bids for the service request further comprises:
receiving the service request for the at least one of the one or more vendor service categories at the at least one of the one or more qualified vendor devices;
presenting the service request on the GUI of the at least one of the one or more qualified vendor devices;
identifying, on the GUI of at the at least one of the one or more qualified vendor devices, a bid amount; and
submitting the bid amount from the at least one of the one or more qualified vendor devices over the network to the processor.

15. A system comprising:
one or more processors; and
one or more memory elements including instructions that when executed cause the one or more processors to:
submit, over a network, from a customer device that is associated with a customer to one or more processors that includes a memory, a new service request inquiry, wherein the new service request inquiry includes information identified or entered by the customer via a Graphical User Interface (GUI) on the customer device that identifies one or more service categories;
generate service request vendor attribute content in response to receiving the new service request inquiry from the customer device, wherein the service request vendor attribute content is based at least in part on a comparison of vendor attribute information stored in the memory for one or more vendor service categories and the information included with the new service request inquiry that identifies the one or more service categories, wherein the service request vendor attribute content includes a user interface to be rendered on the GUI of the customer device as a service request having information fields that are unique for each one of the one or more vendor service categories, wherein content is generated for the customer device that includes the service request vendor attribute content with the service request for each one of the one or more vendor service categories that correspond with the one or more service categories identified by the customer, and wherein the service request vendor attribute content is sent, over the network, by the one or more processors to the customer device;
send, over the network, from the customer device to the one or more processors, the service request for at least one of the one or more vendor service categories, wherein the service request includes service information identified or entered by the customer into the information fields via the GUI of the customer device;
determine, by the one or more processors, qualified vendor content in response to receiving the service request from the customer device, wherein one or more qualified vendors for the qualified vendor content are determined, at least in part, by comparing vendor profile information stored in the memory for one or more vendors with the service information within the information fields of the service request;
sending, over the network, from the one or more processors to one or more qualified vendor devices that are associated with the one or more qualified vendors, a request for bids for the service request from the one or more qualified vendors by generating content for the one or more qualified vendor devices, wherein the content includes the service request;
sending, over the network, from the one or more processors to the customer device, the qualified vendor content that includes the one or more qualified vendors;
generate, by the one or more processors, a request for rebids that includes a bid amount, wherein the request for rebids that includes the bid amount, is sent, over the network, from the one or more processors to the one or more qualified vendor devices to invite any of the one or more qualified vendors to submit another bid amount that is lower than the bid amount, wherein the request for rebids that includes the bid amount is generated in response to receiving, over the network, the bid amount from at least one of the one or more qualified vendor devices, wherein the bid amount is identified or entered by the one or more qualified vendors associated with the at least one of the one or more qualified vendor devices into the content that includes the service request via a GUI of the at least one of the one or more qualified vendor devices; and
submitting, over the network, from the customer device to the one or more processors, an acceptance of the bid amount or the another bid amount, wherein the acceptance of the bid amount or the another rebid amount includes information identified or entered by the customer via the GUI on the customer device.

16. The system of claim 15, wherein generating service request vendor attribute content further comprises the one or more processors storing customer event content before generating the service request vendor attribute content, wherein the customer event content includes the one or more service categories identified or entered by the customer via a user interface rendered on the GUI of the customer device and includes event information identified or entered by the customer into information fields within the user interface via the GUI of the customer device, wherein the customer event content is sent, via the network, from the customer device to the processor and stored by the processor in the memory as the customer event content, wherein the service request vendor attribute content is generated based at least in part on the customer event content, and wherein the customer event content includes one or more of a budget, an event date, an event location and a guest count.

17. The system of claim 15, wherein the vendor profile information for the one or more vendors includes a vendor budget, a vendor travel distance and a vendor location, and wherein the information included with the service request for at least one of the one or more vendor service categories includes a service request budget and a service request location, and wherein determining the one or more qualified vendors comprises:

determining, by the one or more processors, for each one of the one or more vendors, if a distance between the vendor location and the service request location is equal to or less than the vendor travel distance and if the vendor budget is equal to or less than the service request budget; and identifying the qualified vendors in response to determining the one or more qualified vendors where the distance between the vendor location and the service request location is equal to or less than the vendor travel distance and the vendor budget is equal to or less than the service request budget.

18. The system of claim 15, wherein determining the qualified vendor content comprises:

identifying or entering in the information fields of the service request for the at least one of the one or more vendor service categories via the GUI of the customer device, the service information within the information fields of the service request, the service information including a customer budget amount, a customer event location and an event date;

submitting the service request for the at least one of the one or more vendor service categories from the customer device over the network to the one or more processors and determining, by the one or more processors, from the vendor profile information stored in the memory that includes a vendor budget, a vendor travel distance and a vendor location for the one or more vendors, the one or more qualified vendors by determining, for the one or more vendors within the at least one of the one or more vendor service categories, the one or more qualified vendors that have a distance between the vendor location and the service request location that is equal to or less than the vendor travel distance and have the vendor budget that is equal to or less than the service request budget.

19. The system of claim 18, further comprising:

after submitting the service request for the at least one of the one or more vendor service categories from the customer device, receiving, over the network from the one or more processors at the customer device, one or more of an email message, a push notification or a short message service notification that indicates that the service request for the one or more processors has been received by the one or more processors.

20. The system of claim 15, wherein requesting the bids for the service request further comprises:

receiving the service request for the at least one of the one or more vendor service categories at the at least one of the one or more qualified vendor devices;

presenting the service request on the GUI of the at least one of the one or more qualified vendor devices;

identifying, on the GUI of at the at least one of the one or more qualified vendor devices, a bid amount; and submitting the bid amount from the at least one of the one or more qualified vendor devices over the network to the one or more processors.

\* \* \* \* \*